(12) United States Patent
Hanya

(10) Patent No.: US 7,437,242 B2
(45) Date of Patent: Oct. 14, 2008

(54) NAVIGATION APPARATUS

(75) Inventor: Takeshi Hanya, Maebashi (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 519 days.

(21) Appl. No.: 11/228,138

(22) Filed: Sep. 16, 2005

(65) Prior Publication Data
US 2006/0069506 A1  Mar. 30, 2006

(30) Foreign Application Priority Data
Sep. 30, 2004  (JP) .............................. 2004-287764

(51) Int. Cl.
*G01C 21/00* (2006.01)

(52) U.S. Cl. .................. 701/220; 701/200; 701/221; 701/207; 701/225; 33/356

(58) Field of Classification Search ................ 701/200, 701/220–221, 207, 225; 33/356
See application file for complete search history.

(56) References Cited

U.S. PATENT DOCUMENTS

| | | | |
|---|---|---|---|
| 4,862,398 A * | 8/1989 | Shimizu et al. ............... 702/93 |
| 5,023,799 A * | 6/1991 | Nakayama et al. .......... 701/207 |
| 5,040,122 A * | 8/1991 | Neukirchner et al. ....... 701/207 |
| 5,067,083 A * | 11/1991 | Nakayama et al. .......... 701/220 |
| 5,251,139 A * | 10/1993 | Takano et al. ............... 701/221 |
| 5,331,563 A * | 7/1994 | Masumoto et al. .......... 701/207 |
| 5,485,385 A * | 1/1996 | Mitsugi ....................... 701/214 |
| 6,473,689 B1 * | 10/2002 | Egberts ....................... 701/207 |
| 6,631,319 B1 * | 10/2003 | Luh ............................. 701/54 |
| 6,842,991 B2 * | 1/2005 | Levi et al. ..................... 33/356 |

FOREIGN PATENT DOCUMENTS

| | | | |
|---|---|---|---|
| JP | 1-284811 | * | 11/1989 |
| JP | 07267126 A | * | 10/1995 |
| JP | 09-096534 | | 4/1997 |

* cited by examiner

*Primary Examiner*—Cuong H Nguyen
(74) *Attorney, Agent, or Firm*—Renner, Kenner, Greive, Bobak, Taylor & Weber

(57) ABSTRACT

A navigation apparatus mounted on a vehicle is equipped with a first gyro sensor and a second gyro sensor arranged in symmetry with respect to a first axis in a travel direction of the vehicle and to a second axis that passes through the center of gravity of the vehicle, the first and second axes being perpendicular to each other, so that the first and second gyro sensors lean by the same angle from the second axis in opposing directions with respect to a third axis that is perpendicular to the first and second axes. A sensor output circuit is connected to each of the first and second gyro sensors, to output an output signal. A calculator calculates a yaw angular velocity of the vehicle based on the output signal.

3 Claims, 3 Drawing Sheets

NAVIGATION APPARATUS

CROSS-REFERENCE TO RELATED APPLICATIONS

This application is based on and claims the benefit of priority from the prior Japanese Patent Application No. 2004-287764 filed on Sep. 30, 2004, the entire content of which is incorporated herein by reference.

BACKGROUND OF THE INVENTION

The present invention relates to navigation apparatus to be mounted on vehicles such as automobiles and motorcycles. Particularly, this invention relates to a yaw angular-velocity sensor and calculator to be used for a navigation apparatus to detect and calculate a yaw angular velocity of a vehicle with an aid of a gyro sensor provided in an inertial positioning system.

A navigation apparatus to be mounted on a vehicle is generally equipped with an inertial positioning system. The system employs a gyro sensor (or an azimuth angle sensor) to detect yawing of a vehicle and a controller, such as, a micro computer, to calculate a yaw rate through a specific algorithm, the yaw rate being used as basic data for position estimation.

SUMMARY OF THE INVENTION

A purpose of the present invention is to provide a navigation apparatus equipped with a yaw angular-velocity sensor and calculator that has a simple structure but can precisely detect and calculate a yaw angular velocity of a vehicle.

The present invention provides a navigation apparatus mounted on a vehicle comprising: a first gyro sensor and a second gyro sensor arranged in symmetry with respect to a first axis in a travel direction of the vehicle and to a second axis that passes through the center of gravity of the vehicle, the first and second axes being perpendicular to each other, so that the first and second gyro sensors lean by the same angle from the second axis in opposing directions with respect to a third axis that is perpendicular to the first and second axes; a sensor output circuit connected to each of the first and second gyro sensors, to output an output signal; and a calculator to calculate a yaw angular velocity of the vehicle based on the output signal.

Moreover, the present invention provides a method of arranging gyro sensors in a vehicle comprising the steps of: providing a first gyro sensor and a second gyro sensor in symmetry with respect to a first axis in a travel direction of the vehicle and to a second axis that passes through the center of gravity of the vehicle, the first and second axes being perpendicular to each other; and fixing the first and second gyro sensors as leaning by the same angle from the second axis in opposing directions with respect to a third axis that is perpendicular to the first and second axes.

Furthermore, the present invention provides a method of calculating a yaw angular velocity of a vehicle comprising the steps of: obtaining variations X1 and X2 in sensor output voltages obtained from a first gyro sensor and a second gyro sensor, respectively: $X1=A \times \omega \times \cos(\theta-\theta1)$, $X2=A \times \omega \times \cos(\theta+\theta2)$ where A is constant and $\omega$ is a roll angle of the vehicle, the first and second gyro sensors being arranged in symmetry with respect to a first axis in a travel direction of the vehicle and to a second axis that passes through the center of gravity of the vehicle, the first and second axes being perpendicular to each other, so that the first and second gyro sensors lean by the same lean angles $\theta1$ and $\theta2$, respectively, from the second axis in opposing directions with respect to a third axis that is perpendicular to the first and second axes; obtaining a roll angle $\theta$ of the vehicle based on the variations X1 and X2 as follows: $\theta=\operatorname{atan}((X2 \times \cos\theta1 - X1 \times \cos\theta2)/(X2 \times \sin\theta1 + X1 \times \sin\theta2))=\operatorname{atan}((X2-X1) \times \cos\theta0/((X2+X1) \times \sin\theta0))$ where $\theta1=\theta2=\theta0$, and the sign "atan" means arctangent; and obtaining a yaw angular velocity $\omega$ of the vehicle based on the variations X1 and X2 as follows: $\omega=\operatorname{sqrt}((X2-X1 \times \cos(\theta1+\theta2))^2/(A^2 \times \sin(\theta1+\theta2)^2)+X1^2/A^2)=\operatorname{sqrt}((X2-X1 \times \cos(2 \times \theta0))^2/(A^2 \times \sin(2 \times \theta0)^2)+X1^2/A^2)$ where the signs "sqrt" and "A^2" mean the square root and two squared, respectively.

DETAILED DESCRIPTION OF PREFERRED EMBODIMENT

Explained first are two basic techniques in yaw-angular velocity sensing and calculation.

[Technique I]

Figure 1:
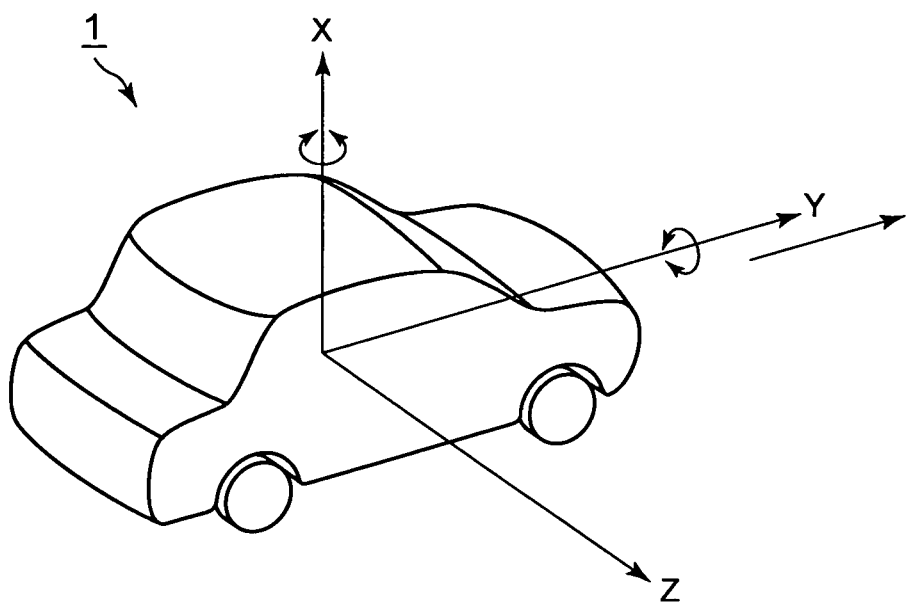
FIG. 1 is a perspective view illustrating movement of a vehicle.

Illustrated in FIG. 1 (a perspective view) is movement of a vehicle (an automobile) 1, with a Y-axis along which the vehicle 1 is traveling, an X-axis that is a vertical axis passing through the center of gravity of the vehicle 1 and perpendicular to the Y-axis, and a Z-axis perpendicular to the X- and Y-axes.

An angel of the vehicle 1 that rotates about the X-axis is termed as a yaw angle. Moreover, an angel of the vehicle 1 that rotates about the Y-axis (leaning of the vehicle 1 in the lateral direction) is termed as a roll angle.

Here, the following expression is given:

$$X = A \times \omega \times \cos\theta (A=\text{constant}) \quad (1)$$

where $\omega$ is a yaw angular velocity at which the vehicle 1 rotates about the X-axis, X is a variation of output from a gyro sensor while detecting the yaw angular velocity $\omega$, and $\theta$ is a lean angle (roll angel) of the vehicle 1 in the lateral direction with respect to the Y-axis along which the vehicle 1 is traveling.

The yaw angular velocity $\omega$ is obtained with the variation X as follows:

$$X \approx B \times \omega (B=\text{constant}) \quad (2)$$

where the sign "≅" means near-equal.

This is because, generally, when an instantaneous yaw angular velocity $\omega$ is obtained, the roll angle $\theta$ can be treated as almost constant (or $\theta=0$) with almost no variation, thus cos $\theta$=constant.

Figure 2:
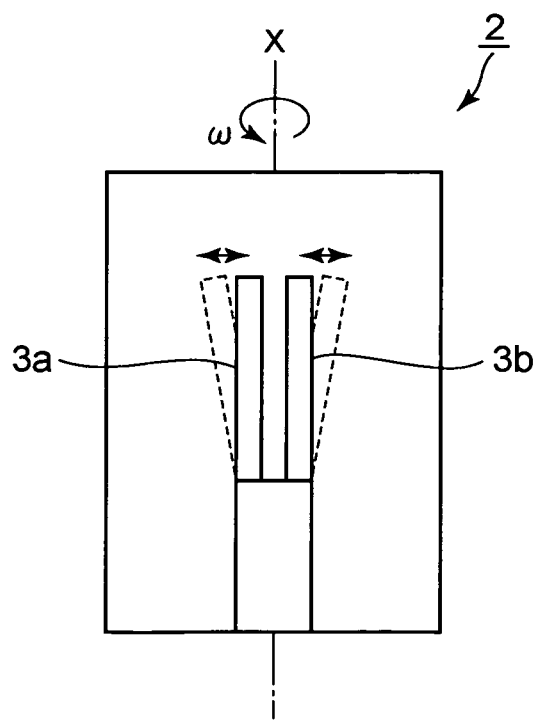
FIG. 2 is a schematic view illustrating a principle of a gyro sensor.

As illustrated in FIG. 2, a gyro sensor 2 is equipped with piezoelectric ceramic elements 3a and 3b that vibrate like a diapason.

When the gyro sensor 2 rotates about the X-axis at an angular velocity $\omega$, Coriolis force appears perpendicularly to the vibration of the piezoelectric ceramic elements 3a and 3b. The force strains the elements 3a and 3b, which is electrically detected. The detected electric signal is output through a sensor output circuit as a sensor-output voltage which is in proportion to the angular velocity $\omega$.

[Technique II]

For more precise yaw-angular velocity sensing and calculation, two gyro sensors may be provided for the vehicle 1 (FIG. 1): one dedicated to detection of leaning in the lateral direction (roll angle); and the other dedicated to detection of yawing (yaw angle).

The first one is provided along the Y-axis around which leaning occurs whereas the second one the X-axis around which yawing occurs. Each gyro sensor is provided at 90 degrees to the corresponding axis.

Here, the following expressions are given:

$$X = A \times \omega \times \cos\theta \, (A = \text{constant}) \quad (3)$$

$$Y = B \times \cos\theta \, (B = \text{constant}) \quad (4)$$

where X is a variation of output from the gyro sensor dedicated to detection of yawing, Y is a variation of output from the gyro sensor dedicated to detection of leaning, $\omega$ is a yaw angular velocity, and $\theta$ is leaning (roll angel) of the vehicle 1 in the lateral direction.

Leaning (roll angel) $\theta$ of the vehicle 1 in the lateral direction is obtained by the expression (4).

The yaw angular velocity $\omega$ is obtained by the following expression (5) which is given by the expressions (3) and (4).

$$X = C \times \omega \times Y \, (C = \text{constant}) \quad (5)$$

The techniques explained as above have problems as follows:

In detail, "cos $\theta$=constant" cannot be applied to the expression (1) or variation of cos $\theta$ cannot be ignored, which results in change in X based on $\omega$ and cos $\theta$ (the expression (2) is useless), when the technique I is used in yaw-angular velocity sensing and calculation for a vehicle, such as, a motorcycle. Because a motorcycle leans very much when it turns right or left and the lean angle is always different. Thus, a precise yaw angular velocity $\omega$ cannot be obtained based on a gyro output variation X without a lean angle (roll angel) $\theta$.

The technique II using two gyro sensors dedicated to leaning and yawing, respectively, requires processing and training signals in learning processing (filtering, correction, etc.) for each gyro output, resulting in a complex and expensive system configuration.

A navigation apparatus equipped with a global positioning system (GPS) and a map database for map matching uses outputs of the system and database as training signals for learning (sensor correction) in the yaw direction in an inertial positioning system. However, if the technique II using two dedicated gyro sensors is applied to such apparatus employing map matching, it requires roll data for yaw calculation and also a learning system dedicated to learning processing to the output of a roll-dedicated gyro sensor.

An embodiment of a navigation apparatus according to the present invention will now be explained in detail.

Figure 3:
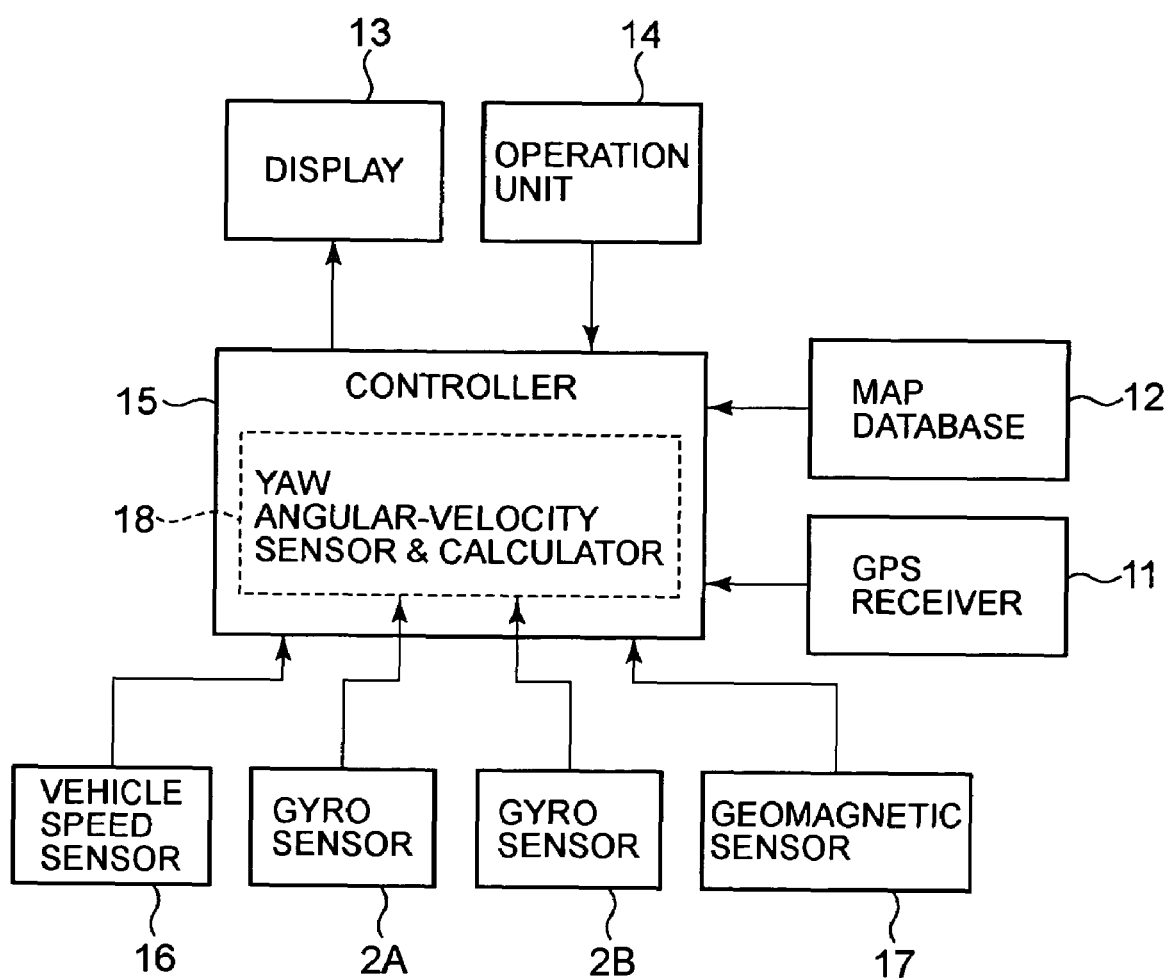
FIG. 3 shows a block diagram of an embodiment of a navigation apparatus according to the present invention.
Figure 4:
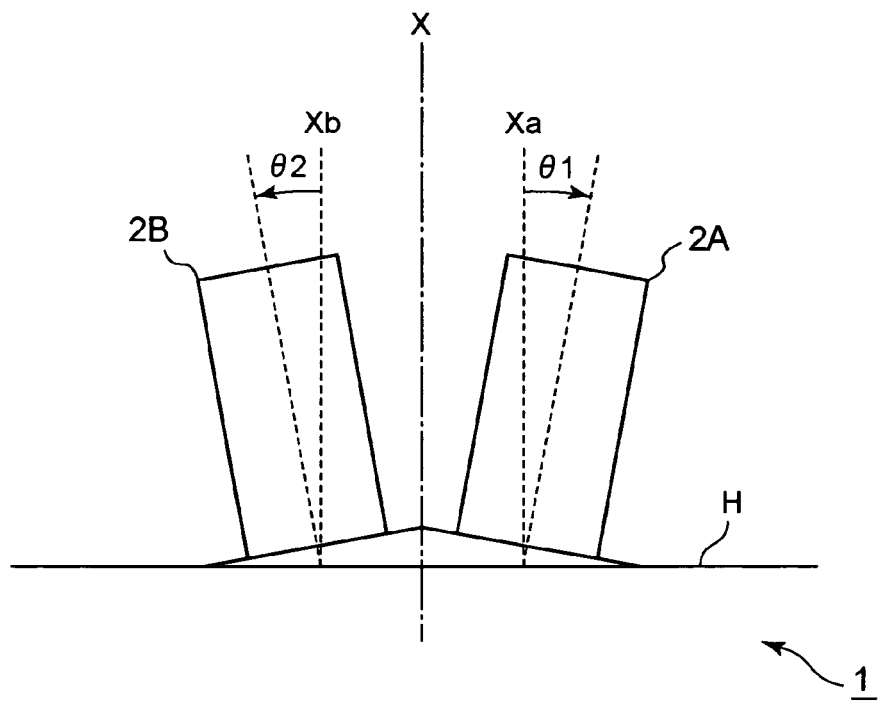
FIG. 4 is a schematic view illustrating an arrangement of two gyro sensors in a yaw angular-velocity sensor and calculator according to the present invention.
Figure 5:
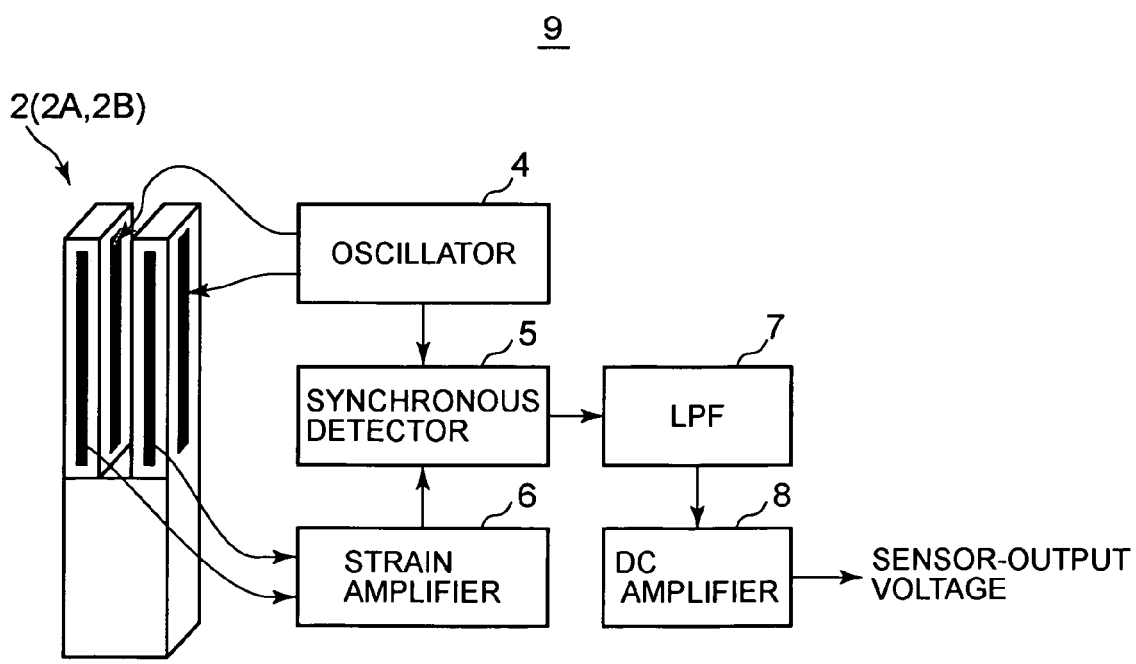
FIG. 5 shows a block diagram of a sensor output circuit for the gyro sensors of the navigation apparatus according to the present invention.

FIG. 3 shows a block diagram of an embodiment of a navigation apparatus according to the present invention. FIG. 4 illustrates an arrangement of two gyro sensors according to the present invention. FIG. 5 shows a block diagram of a sensor output circuit for gyro sensors of the navigation apparatus according to the present invention.

A navigation apparatus 10 according to the present invention is mounted on the vehicle 1 (FIG. 1) such as an automobile or a motorcycle.

The navigation apparatus 10 is equipped with: a GPS receiver 11 (a major component in a global positioning system); a geomagnetic sensor 17, and gyro sensors 2A and 2B (the sensors 17, and 2A and 2B being azimuth sensors in an inertial positioning system); a vehicle speed sensor 16 for obtaining a distance signal in accordance with a travel distance of the vehicle 1, based on the wheel rotation number; a map database 12 (DVD-ROM, HDD or CD-ROM) for map matching and map displaying; a display 13 (LED, etc.) for displaying guidance maps; an operation unit 14 with an operation switch, voice recognition equipment, etc.; and a controller 15 with a micro computer for computation in the global and inertial positioning systems and entire control of the navigation apparatus 10.

Preferably, the gyro sensors 2A and 2B have the substantially identical characteristics on, for example, sensitivity to angular velocity. The output voltage of a gyro sensor varies when the sensor detects angular velocity. Sensitivity [mV/(deg/sec)] indicates how much the output voltage of a gyro sensor varies when the sensor rotates at a given angular velocity [deg/sec)].

The controller 15 is equipped with a yaw angular-velocity sensor and calculator 18 for sensing and calculating a yaw angular velocity of the vehicle 1.

The yaw angular-velocity sensor and calculator 18 is equipped with sensor output circuits 9 (FIG. 5) each for picking up a varying electric signal from the corresponding gyro sensor 2A or 2B, and a calculator in which a CPU of the micro computer (controller 15) calculates a yaw angular velocity $\omega$ of the vehicle 1 through a specific algorithm pre-programmed in memory.

The gyro sensors 2A and 2B are arranged as illustrated in FIG. 4. In detail, the sensors 2A and 2B are arranged in symmetry with respect to the X- and Y-axes (FIG. 1) so that they lean by the same angles $\theta1$ and $\theta2$ ($\theta1=\theta2=\theta0$), on the horizontal plane H (corresponding to the Z-axis) of the vehicle 1, from Xa- and Xb-axes, respectively, which are parallel to the X-axis and perpendicular to the horizontal plane H.

The gyro sensors 2A or 2B may be equipped with piezo-electric ceramic elements such as shown in FIG. 2. Or, they may be gas-rate or optical-fiber gyro sensors.

As shown in FIG. 5, each sensor output circuit 9 includes: an oscillator 4 for applying vibration to the corresponding gyro sensor 2A or 2B; a strain amplifier 6 for amplifying an output voltage from the sensor 2A or 2B, corresponding to the vibration; a synchronous detector 5 for detecting a slight electric signal from the amplified voltage; a low-pass filter (LPF) 7 for filtering out noises from the electric signal; and a DC amplifier 8 for amplifying the filtered electric signal as a sensor output voltage.

The present invention with the specific arrangements of the gyro sensors 2A and 2B shown in FIG. 4 achieves simple calculation of a lean angle (roll angel) $\theta$ of the vehicle 1 in the lateral direction with a specific algorithm disclosed below.

FIG. 4 depicts an X-Z plane between the X- and Z-axes (FIG. 1). In this figure, each of the angles $\theta1$ and $\theta2$ ($\theta1=\theta2=\theta0$) of the gyro sensors 2A and 2B, respectively, is a lean angle (fixed angle) with respect to the X-axis. Each gyro sensor is provided as having a lean angle of 0 degrees with respect to the X-axis in an X-Y plane between the X- and Y-axes (FIG. 1) when the vehicle 1 is viewed along the travel direction (Y-axis).

Suppose that the vehicle 1 turns right or left, so that the gyro sensors 2A and 2B lean by a roll angle $\theta$ with respect to the X-axis, thus a yaw angular velocity $\omega$ is generated.

Variations X1 and X2 in sensor output voltages of the sensor output circuits 9 for the gyro sensors 2A and 2B having the fixed angles $\theta1$ and $\theta2$ (FIG. 4), respectively, are given as follows:

$$X1 = A \times \omega \times \cos(\theta - \theta1) \, (A = \text{constant}) \quad (6)$$

$$X2 = A \times \omega \times \cos(\theta + \theta2) \, (A = \text{constant}) \quad (7)$$

The expressions (6) and (7) give a roll angle $\theta$ as below when $\theta1=\theta2=\theta0$:

$$\theta = \mathrm{atan}((X2 \times \cos\theta1 - X1 \times \cos\theta2)/(X2 \times \sin\theta1 + X1 \times \sin\theta2)) \quad (8)$$
$$= \mathrm{atan}((X2 - X1) \times \cos\theta0/((X2 + X1) \times \sin\theta0))$$

where the sign "atan" means arctangent.

Likewise, a yaw angular velocity ω is given as follows:

$$\omega = \mathrm{sqrt}((X2 - X1 \times \cos(\theta1 + \theta2))^{\wedge}2/(A^{\wedge}2 \times \sin(\theta1 + \theta2)^{\wedge}2) + X1^{\wedge}2)/A^{\wedge}2) \quad (9)$$
$$= \mathrm{sqrt}((X2 - X1 \times \cos(2 \times \theta0))^{\wedge}2/(A^{\wedge}2 \times \sin(2 \times \theta0)^{\wedge}2) + X1^{\wedge}2/A^{\wedge}2)$$

where the signs "sqrt" and "^2" mean the square root and two squared, respectively.

As disclosed above, a roll angle θ and a yaw angular velocity ω are given with simple calculation employing the expressions (8) and (9), respectively, using the variations X1 and X2 in sensor output voltages of the sensor output circuits 9 for the gyro sensors 2A and 2B.

The algorithm disclosed above is programmed in a memory such as ROM in the micro computer of the controller 15 (FIG. 3).

As disclosed above, the present invention gives a roll angle θ and a yaw angular velocity ω with simple calculation and achieves high accuracy for an inertial positioning system.

Moreover, the present invention employs two gyro sensors, each for both leaning and yawing, i.e., not dedicated to leaning or yawing, thus achieving a simple system configuration with cost down.

The two gyro sensors are arranged in symmetry with the same lean angle, thus the present invention readily achieving a learning function for gyro-sensor output processing (filtering, correction, etc.).

Furthermore, not only automobiles, the present invention is applicable to navigation apparatus for motorcycles, personal watercrafts, motorboats, etc., which turn at a larger roll angle.

What is claimed is:

1. A navigation apparatus mounted on a vehicle having a center of gravity comprising:
    a first gyro sensor and a second gyro sensor arranged in symmetry with respect to a first axis in a travel direction of the vehicle and to a second axis that passes through the center of gravity of the vehicle, the first and second axes being perpendicular to each other, so that the first and second gyro sensors lean by the same angle from the second axis in opposing directions with respect to a third axis that is perpendicular to the first and second axes;
    a sensor output circuit connected to each of the first and second gyro sensors, to output an output signal; and
    a calculator to calculate a yaw angular velocity of the vehicle based on the output signal.

2. The navigation apparatus according to claim 1, wherein the calculator:
    obtains variations X1 and X2 in output signals from the first and second gyro sensors, respectively, via the sensor output circuit, as follows:

$X1 = A \times \omega \times \cos(\theta - \theta1)$ $X2 = A \times \omega \times \cos(\theta + \theta2)$ where A is constant, ω is a roll angle of the vehicle, and θ1 and θ2 are angles by which the first and second gyro sensors lean from the second axis in the opposing directions, respectively;
    obtains a roll angle θ of the vehicle based on the variations X1 and X2 as follows:

$$\theta = \mathrm{atan}((X2 \times \cos\theta1 - X1 \times \cos\theta2)/(X2 \times \sin\theta1 + X1 \times \sin\theta2))$$
    $$= \mathrm{atan}((X2 - X1) \times \cos\theta0/((X2 + X1) \times \sin\theta0))$$

where θ1 = θ2 = θ0, and the sign "atan" means arctangent; and
    obtains a yaw angular velocity w of the vehicle based on the variations X1 and X2 as follows:

$$\omega = \mathrm{sqrt}((X2 - X1 \times \cos(\theta1 + \theta2))^{\wedge}2/(A^{\wedge}2 \times \sin(\theta1 + \theta2)^{\wedge}2) + X1^{\wedge}2)/A^{\wedge}2)$$
    $$= \mathrm{sqrt}((X2 - X1 \times \cos(2 \times \theta0))^{\wedge}2/(A^{\wedge}2 \times \sin(2 \times \theta0)^{\wedge}2) + X1^{\wedge}2/A^{\wedge}2)$$

where the signs "sqrt" and "^2" mean the square root and two squared, respectively.

3. A computer implemented method of calculating a yaw angular velocity of a vehicle comprising the steps of:
    obtaining variations X1 and X2 in sensor output voltages obtained from a first gyro sensor and a second gyro sensor, respectively:

$X1 = A \times \omega \times \cos(\theta - \theta1)$ $X2 = A \times \omega \times \cos(\theta + \theta2)$ where A is constant and ω is a roll angle of the vehicle, the first and second gyro sensors being arranged in symmetry with respect to a first axis in a travel direction of the vehicle and to a second axis that passes through the center of gravity of the vehicle, the first and second axes being perpendicular to each other, so that the first and second gyro sensors lean by the same lean angles θ1 and θ2 respectively, from the second axis in opposing directions with respect to a third axis that is perpendicular to the first and second axes;
    obtaining a roll angle e of the vehicle based on the variations X1 and X2 as follows:

$$\theta = \mathrm{atan}((X2 \times \cos\theta1 - X1 \times \cos\theta2)/(X2 \times \sin\theta1 + X1 \times \sin\theta2))$$
    $$= \mathrm{atan}((X2 - X1) \times \cos\theta0/((X2 + X1) \times \sin\theta0))$$

where θ1 = θ2 = θ, and the sign "atan" means arctangent; and
    obtaining a yaw angular velocity ω of the vehicle based on the variations X1 and X2 as follows:

$$\omega = \text{sqrt}((X2 - X1 \times \cos(\theta 1 + \theta 2))\wedge 2 / (A\wedge 2 \times \sin(\theta 1 + \theta 2)\wedge 2) + X1\wedge 2)/A\wedge 2)$$

$$= \text{sqrt}((X2 - X1 \times \cos(2 \times \theta 0))\wedge 2 / (A\wedge 2 \times \sin(2 \times \theta 0)\wedge 2) + X1\wedge 2 / A\wedge 2)$$

where the signs "sqrt" and "^2" mean the square root and two squared, respectively.

\* \* \* \* \*